G. A. BAUSMAN.
PROCESS FOR THE MATURING OF CHOCOLATE AND THE LIKE.
APPLICATION FILED JAN. 20, 1919.
1,381,694.
Patented June 14, 1921.
2 SHEETS—SHEET 1.
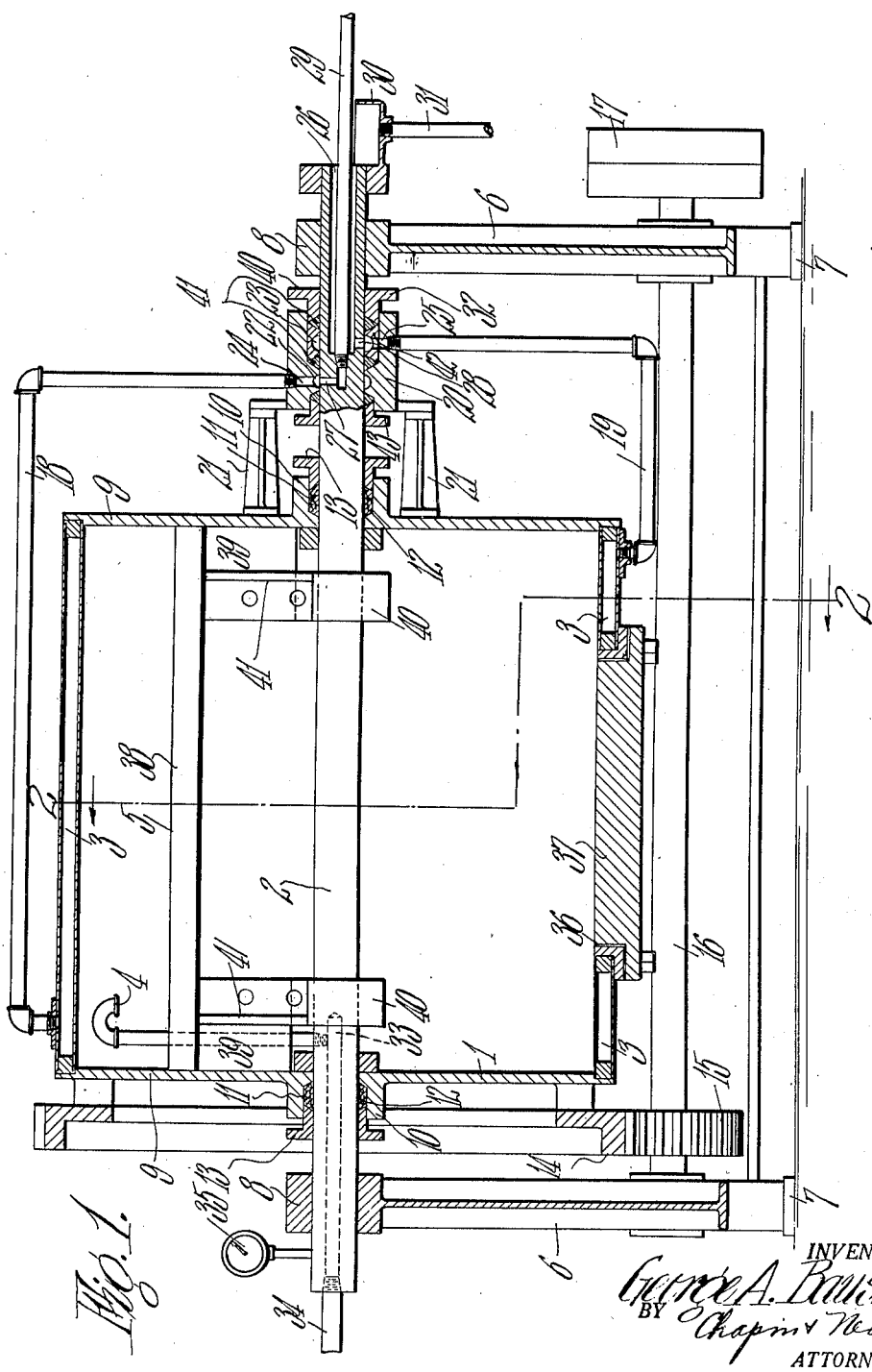
INVENTOR.
George A. Bausman.
BY Chapin & Neal.
ATTORNEYS.

G. A. BAUSMAN.
PROCESS FOR THE MATURING OF CHOCOLATE AND THE LIKE.
APPLICATION FILED JAN. 20, 1919.
1,381,694.
Patented June 14, 1921.
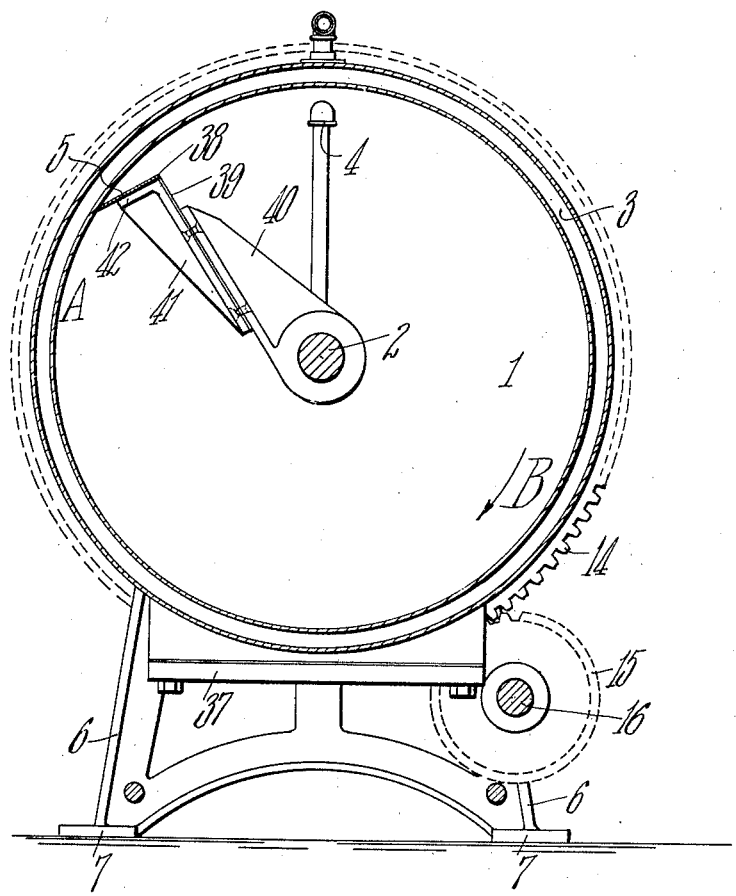
INVENTOR.
George A. Bausman
BY
ATTORNEYS.

UNITED STATES PATENT OFFICE.

GEORGE A. BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

PROCESS FOR THE MATURING OF CHOCOLATE AND THE LIKE.

1,381,694.      Specification of Letters Patent.     Patented June 14, 1921.

Application filed January 20, 1919. Serial No. 272,096.

*To all whom it may concern:*

Be it known that I, GEORGE A. BAUSMAN, a citizen of the United States of America, residing at Springfield, in the county of Hampden and State of Massachusetts, have invented certain new and useful Improvements in Processes for the Maturing of Chocolate and the like, of which the following is a specification.

My invention relates to a process especially suitable for the maturing of chocolate but may likewise be used for any other generally similar substances of food which are susceptible to the treatment.

In general, the process is particularly adapted for the maturing, or super-refining, of chocolate and confectionery liquors. The term "chocolate liquors" is used in its generic significance to include bitter as well as sweet liquors, chocolate coatings, milk chocolate, soft molding pastes, and other generally similar substances which include as a constituent some part of the cocoa bean, or its substitutes. The term "confectionery liquor" is used to denote other confectionery substances which are susceptible to the treatment, as, for example, "white coatings" which include sugar and cocoa butter or cocoa butter substitutes.

The appeal, which chocolate goods make to the eater, is dependent to a considerable extent upon the sensation of smoothness which the chocolate gives to the tongue. Chocolate that seems rough to the tongue is objectionable, no matter of what high quality the chocolate may be inherently. It is, therefore, most important to the manufacturer that his chocolate does not give the sensation of roughness to the tongue. So, various machines, such as melangeurs, conges, chasers and so forth have come into widely extended use, in efforts to produce chocolate free from this sensation of roughness to the eater.

The ideal smoothness has been secured only with difficulty by prior machines and the use of power and time way beyond that necessary with the present invention. The fault of the prior machines has been, I believe, that rolling with rolls and haphazard churning action, upon which they depended was decidedly inefficient. Certainly, the time required to smooth all the particles has been so great that it has been a serious drawback to have to work the batch for such a length of time.

With these difficulties in mind, I have invented a process for the "maturing" of chocolate and the like, which is not dependent upon the use of rolls, or the haphazard churning around of the chocolate liquor. My process involves none of these features. Instead, it is dependent on the systematic and controlled tumbling, or rolling, of one particle against another. It produces in a much shorter time, as compared to previous practice, a highly superior product, free from the rough sensation for the eater to which I have referred.

I use this term "tumbling" to describe as near as may be the turning of a portion of the liquor over on itself to flow over itself, as distinguished from haphazard churning movement. The action itself, in this art, being hitherto unrecognized and unpractised, it is of course without a recognized word to describe it.

The reason that this "tumbling" produces chocolate wholly without roughness and in such a short time, comparatively, is, I am inclined to think, that the solid or fibrous particles (which form one constituent of the chocolate liquor) rub against each other and wear each other smooth without scarring because the particles are of the same hardness; and that the particles are rounded by being rotated in the liquid cocoa butter constituent of the liquor, as will occur if a body is spun in surrounding liquid. And, with this action, the particles of the initial batch are made smooth rather than substantially smaller, which smoothing action is a great time saver and at the same time wholly satisfactory as, when the particles of the batch are made smooth, they do not need to be made small. Thus, a great amount of time is saved as against a refining action intended to make the particles smaller.

As another feature of my invention I prefer, during the smoothing procedure, to subject the chocolate liquor to at least a partial vacuum in a heated container. In this way, I am able to remove such moisture as desired from, and increase the density of, the chocolate liquor, while keeping the mass well below the temperature which would caramelize it. So, I am able to reduce the time of treatment to a very great extent, as compared with prior processes, in which evaporation at merely atmospheric pressure occurred in a wholly haphazard manner.

Other features of the invention will appear as the description proceeds.

One object of my invention is to provide a process for the rapid production of refined chocolate, the particles of the initial batch being made uniformly smooth, round, and without sharp or jagged contours.

Another object is to effectively eliminate the moisture in the chocolate while it is being refined.

Another object is to refine chocolate more effectively than heretofore possible under prior practice.

To these ends, and also to improve generally upon processes of the character indicated, my invention consists in the following matters hereinafter described and claimed.

Without restricting the broad aspects of my invention thereto, I show, in the accompanying drawings, an apparatus adapted for use in the performance of my process; and in these drawings:

Figure 1 is a longitudinal diametrical section; and

Fig. 2 is a cross section taken substantially on the line 2—2 of Fig. 1.

I will first briefly describe the illustrated apparatus, sufficiently for the purpose of then describing the process:—

A containing drum 1 is carried by the shaft 2 for rotation thereabout. This drum is double walled to present a steam or water chamber or jacket 3 to which steam or water is supplied to warm the chocolate liquor. A vacuum connection is provided for the interior of the drum by the pipe 4. Mounted upon the shaft is a stationary scraper 5 in contact with the inner peripheral surface of the drum, preferably somewhat above the highest point assumed by the liquor when the liquor is being rolled.

In practising the process:— the liquor which already, if desired, has been brought to that point where the usual refiners would ordinarily be used, and consists, of course of solid or fibrous particles together with liquid cocoa butter, is placed in the drum, and the drum rotated at such speed as desired, to carry the viscous mass upward in the direction of rotation, say, roughly to the point A (Fig. 2), wherefore the liquor somewhere near the point A, rolls over on itself and tumbles down along the inclined face of the liquor, say, to about the point B, continuously. In this action, I conceive, the particles roll, the one on the other, and not only does this action occur, but also the particles are rolled and tumbled about in the cocoa butter content of the liquor which action also most valuably aids in the rounding and smoothing of the particles. Nothing of a character to scar, sharpen, or crush the particles takes place, and all the particles are rounded and smoothed as desired. The rotation of the drum is continued until test shows that all particles have been rounded and no sensation of roughness occurs when the chocolate is tasted.

During the performance of the above action the scraper acts to remove any chocolate, which might otherwise tend to stick to the side and end walls of the drum and thereby insulate the rest of the material from the side of the drum and be itself unduly heated. More than that, the scraper acts to inaugurate the tumbling of such liquor, as might be carried that far upon the drum.

While the tumbling action is being performed the liquor is heated by the steam or hot water in the jacket, and vacuum is preferably established in the drum at the same time. This gives a forced evaporation for moisture in the chocolate mass so that the temperature can be kept well below the point where the mass would be caramelized—but yet rapid evaporation effected. In addition the vacuum causes the occluded air or gases in the chocolate mass to break out and escape whereby the mass is rendered more dense, and therefore more desirable, than would otherwise be the case if partial vacuum conditions in the drum did not prevail during the refining of the chocolate.

As to the details of the exemplary apparatus illustrated: Conveniently uprights 6, 6 rise from the bases 7, 7 of the machine to stationarily receive the ends of the shaft 2 in their joined upper ends 8, 8. The end plates 9, 9 of the drum fixedly connected with the cylindrical side wall thereof, are rotatably mounted upon the shaft 2 by the bearings 10, 10, provided with suitable stuffing boxes 11, 11, packing 12, 12 and glands 13, 13.

The drum is driven by the gear 14, fixed to the drum and receiving motion from the gear 15, which in turn is fixed to the driving shaft 16, rotatably mounted on the machine frame, and driven by the pulley 17.

A mixture of hot water and steam is introduced to the jacket 3, through the pipe 18, and flows, preferably with the steam condensed from the jacket, through the pipe 19. These pipes are conveniently associated with the drum as follows: The connector 20 is carried on the shaft 2, to rotate with the drum, being connected thereto by the brackets 21, 21. The connector has a pair of circumferential grooves 22 and 23, the groove 22 being connected to the pipe 19 by the passage 25. The shaft 2 has a passage 26 therein, which communicates at its reduced inner end with a passage 27 leading to the groove 22, and which passage 26 at its larger portion communicates with the groove 23 by a passage 28. A pipe 29 of less diameter than the major portion of the passage 26, is screwed into the reduced end of the passage. At the outer end of the passage 26, the shaft carries a drip cup 30 and drain pipe 31. The connector 20 is provided with suitable stuffing box constructions 32 and 43. With this arrangement it will be seen that steam introduced to the pipe 29 will flow through the passage 27, the groove 22, the passage 24, the pipe 18, the jacket 3, the pipe 19, the passage 25, the groove 23, the passage 28, the passage 26, the drip cup 30 and the pipe 31, thus providing a proper circuit for the steam.

The exhaust pipe 4 is connected with a passage 33 in the shaft, which passage is in communication with any suitable exhaust apparatus (not shown) by the pipe 34, a vacuum gage 35 being conveniently connected with the passage 33, if desired.

Access to the drum is obtained by an aperture 36, which is closed by cover 37, removably secured thereto by any suitable means.

The scraper, designated generally as 5, comprises, preferably and as illustrated, a rectangular plate 38, extending substantially from end to end of the drum and sufficiently flexible to closely follow, and at all times contact, the wall of the drum, and end-wall scraper blades 39, 39, desirably rectangular in shape, and each scraping the adjacent end wall with its longitudinal edge in contact therewith. As illustrated, the blades are carried by radially extending brackets 40, 40, stationarily carried by the shaft 2, braces 41, 41 being bolted to the brackets, blade 38 being attached to the top arms 42, 42, of the braces, and the blades 39, 39 being clamped each between a bracket and brace. Conveniently the stuffing box construction 32 includes the gland 40, packings 41 and spacer-gland 42 and, since the spacer 42 of course rotates with the body of the connector, the groove 23, as a matter of detail and convenience is provided therein.

The process herein disclosed may be carried out by other apparatus and is independent of the apparatus disclosed herein.

Having thus described my invention what I claim as new and desire to secure by Letters Patent is:—

1. The method of maturing chocolate and confectionery liquors, which consists in systematically causing the particles of the mass to repeatedly rub upon one another free from pressure except that of its own mass, to improve the smoothness of the liquor.

2. The method of maturing chocolate and confectionery liquors, which consists in systematically causing the particles of the mass to repeatedly rub upon one another by a tumbling action free from pressure except that of its own mass, to improve the smoothness of the liquor.

3. The method of maturing chocolate and confectionery liquors, which consists in systematically causing the particles of the mass to repeatedly rub upon one another free from pressure except that of its own mass, and at the same time subjecting the liquor to a temperature less than that at which it would be caramelized and to a pressure less than atmospheric pressure and sufficient to substantially accelerate evaporation at such temperature.

4. The method of treating chocolate and confectionery liquors, which consists in the repeated tumbling of portions of the liquor over the remainder thereof to thereby round and smooth the chocolate particles, while at the same time subjecting the liquor to a temperature less than that necessary to caramelize the liquor, and to a pressure sufficiently less than atmospheric to provide that the desired amount of moisture and occluded gases shall be removed in substantially the same time as that required to sufficiently smooth and round the particles.

5. The method of maturing chocolate and confectionery liquors, which consists in systematically and repeatedly tumbling portions of the liquor over the remainder thereof to cause the particles of the mass to repeatedly rub upon one another and thereby smooth them.

6. The method of maturing chocolate and confectionery liquors, which consists in systematically and repeatedly tumbling portions of the liquor over the remainder thereof to cause the particles of the mass to repeatedly rub upon one another and thereby smooth them, while at the same time subjecting the liquor to forced evaporation.

GEORGE A. BAUSMAN.